United States Patent [19]

Demko et al.

[11] 4,018,959

[45] Apr. 19, 1977

[54] CORRUGATING ADHESIVE COMPOSITIONS CONTAINING THERMOPLASTIC POLYMER, THERMOSETTING RESIN, AND STARCH

[75] Inventors: Paul R. Demko, Edison; Frank J. Washabaugh, Titusville; Robert H. Williams, Piscataway, all of N.J.

[73] Assignee: National Starch and Chemical Corporation, Bridgewater, N.J.

[22] Filed: Dec. 10, 1975

[21] Appl. No.: 639,273

Related U.S. Application Data

[63] Continuation-in-part of Ser. No. 537,174, Dec. 30, 1974, abandoned.

[52] U.S. Cl. .............................. 428/182; 260/17.3; 260/17.4 ST
[51] Int. Cl.² ..................... B32B 3/28; C08L 3/02
[58] Field of Search .................. 260/17.3; 428/182

[56] References Cited

UNITED STATES PATENTS

| | | | |
|---|---|---|---|
| 2,641,584 | 6/1953 | Martone | 260/17.3 |
| 3,001,985 | 9/1961 | Sowell et al. | 260/17.3 |
| 3,487,033 | 12/1969 | McElmury et al. | 260/17.3 |
| 3,728,141 | 4/1973 | Ray-Chaudhuri | 106/213 |

OTHER PUBLICATIONS

Chem. Absts.: 80(1974):60707X, "Adhesive," Pascu et al.
Chem. Absts.: 77(1972):20830p, "Adhesive-Structures," Klein.
Chem. Absts.: 77(1972)166,461R, "Paper Coating Compositions," Kuehlkamp et al.
Chem. Absts.: 71(1969):92871b, "Wall Paper Coating," Elgood.

*Primary Examiner*—Edward M. Woodberry
*Attorney, Agent, or Firm*—Thomas B. Graham

[57] ABSTRACT

Improved adhesive compositions useful in the manufacturing of corrugated boards are disclosed; said compositions being comprised of a mixture of: (a) a crosslinkable water dispersible polymer, (b) an ungelatinized starch, (c) a urea-formaldehyde resin, (d) an acidic metal salt, and (e) water.

12 Claims, No Drawings

CORRUGATING ADHESIVE COMPOSITIONS CONTAINING THERMOPLASTIC POLYMER, THERMOSETTING RESIN, AND STARCH

This invention relates to improved adhesive compositions useful in the manufacture of corrugated board. Said compositions are characterized by their ability to form highly water-resistant bonds which are capable of remaining stable and, in fact, become even more water-resistant when subjected to the higher levels of moisture and temperatures called for in "rigid-when-wet" processing of the corrugated board.

The procedures employed in the production of corrugated board normally involve a continuous process wherein a strip of paperboard is first corrugated by means of heated, fluted rolls. An adhesive is applied to the protruding tips on one side of this corrugated strip and a flat sheet of paperboard, referred to as a liner, is then brought into contact with these tips and, by the application of heat and pressure, a bond is subsequently formed. The product thus prepared is known as a single faced board inasmuch as it has a liner on only one surface thereof. However, by repeating the above described bonding process on the exposed side of the corrugated strip of the single faced board, there is then produced so-called double faced board comprising an inner corrugated layer sandwiched between two liners.

In the production of corrugated board, it is often necessary to render the corrugated board acceptable for use as containers employed in high moisture environment applications. Conventional method designed for this purpose usually involve treating or impregnating at least one of the components or the entire assembly with a moisture repellent mixture. Such methods usually call for higher temperatures ranging from about 250° to about 450° F. Therefore, in order to obtain a finished corrugated board which displays the desired "rigid-when-wet" properties, it is necessary that the adhesive bonds therein remain intact throughout the subsequent treatment with the moisture repellent mixture, i.e. waterproof (water-resistant) and thermally stable.

It is well known to those skilled in the art that starch based and silicate based adhesives are widely used in the corrugated board industry. It is also well known that the water-resistance of such adhesives may be limitedly enhanced by the addition thereto of certain chemical modifiers. Nevertheless, as the demand for rigid-when-wet corrugated fiberboard increases, practitioners have encountered considerable difficulty in their efforts to provide a corrugating adhesive which produces bonds which are capable of remaining water resistant and thermally stable during the subsequent processing of the corrugated board.

Heretofore, various procedures have been devised to produce potentially waterproof, corrugating adhesive compositions. One of such procedures involves combining an amylaceous material with urea-formaldehyde resins and aluminum sulfate as a catalyst. The bonds of the corrugated boards prepared from these adhesives display some improved water resistance. However, the low pH levels (less than 5.0) called for in such systems impart undesirable rate and flow properties to the adhesive compositions, thus resulting in greatly reduced machine speeds.

Other waterproofing corrugating adhesive such as those employing resorcinol and formaldehyde with starch are plagued with, in addition to the costliness of the resorcinol, shortcomings such as the slow rate of the bond formation resulting from the incompatibility of the starch based adhesive with the borax added as a tackifying agent.

Still other waterproofing corrugating adhesives employ a product of acetone with urea or with formaldehyde as the water-proofing agent. Particular shortcomings of these adhesives are their relatively shorter storage lives and concomitant, rapid loss of other desirable characteristics.

Also, of particular concern is the inability of many compositions of the prior art, such as those which consist mostly of thermoplastic materials, to display the desired heat resistance and rapid tack buildup called for by currently utilized corrugators. It is due to their thermoplasticity that these materials become less heat stable and essentially gummy at low speeds, and tend to form deposits on the machine which require frequent shut-downs for cleanup.

Hence, it becomes obvious that a need exists for a corrugating adhesive which is capable of overcoming the aforementioned problems without offsetting any desired characteristics or properties.

It is, thus, the prime object of this invention to provide corrugating adhesive compositions which are characterized by their ability to produce highly water-resistant and thermally stable bonds. It is a further object of this invention to provide adhesive compositions useful in the production of corrugated board which is intended to be subsequently processed for use a rigid-when-wet boxboard material. Still other objects and advantages of this invention will become apparent from the following description thereof.

SUMMARY OF THE INVENTION

We have now found that corrugating adhesives capable of overcoming the problems of the prior art discussed above can be prepared. More particularly, we have found that corrugating adhesive compositions capable of producing highly water-resistant and thermally stable bonds may be prepared by mixing (a) a crosslinkable polymer selected from the group consisting of vinyl acetate homopolymers; copolymers of vinyl acetate with one or more ethylenically unsaturated comonomers; and copolymers of $C_1$–$C_8$ alkyl esters of acrylic and methacrylic acids, and one or more ethylenically unsathurated comonomers; (b) ungelatinized starch; (c) a urea-formaldehyde resin or melamine-formaldehyde resin; (d) an acidic metal salt curing agent; and (e) water. The compositions are characterized by their ability to form stable water-resistant bonds.

Briefly, in the preparation of our novel adhesive compositions it is essential that, in all cases, the amount of ungelatinized starch utilized be from about 0.5 to 6.0 times the amount of the resinous solid content of the particular polymer and, that said compositions have a viscosity within the prescribed range of about 100 to 2,500 cps. and preferably, about 200 to 1,400 cps. Compositions having a viscosity above 1,400 cps. are too viscous to be utilized at top machined speeds. Compositions having a viscosity above 2,500 cps. can be used only at lower machine speeds, mainly because of poor adhesive transfer and adhesive build-up on the paper guides of the corrugator.

DESCRIPTION OF THE PREFERRED EMBODIMENTS

The polymers useful in the practice of this invention are in all instances water dispersible and crosslinkable, i.e., self-crosslinking or capable of being crosslinked externally with a thermosetting resin, used in aqueous-emulsion form. Among the useful polymers are included homopolymers of vinyl acetate; copolymers of vinyl acetate with one or more copolymerizable comonomers, such as for example, (1) alkyl esters of acrylic and methacrylic acids wherein the alkyl group contains from 1 to 8 carbon atoms, e.g. methyl acrylate, methyl methacrylate, ethyl acrylate, ethyl methacrylate, butyl acrylate, etc.; (2) mono- or dialkyl esters of alpha-, beta-unsaturated dicarboxylic acids having 3 – 6 carbon atoms, wherein the alkyl group(s) contains from 1 to 8 carbon atoms, such as monoethyl maleate, dimethyl maleate, dibutyl maleate, etc., as well as the corresponding fumarates, itaconates, and citraconates; (3) alpha-, beta-unsaturated mono and dicarboxylic acids having 3 – 6 carbon atoms such as crotonic, acrylic, methacrylic, maleic, itaconic, and citraconic acids; (4) vinyl halides such as vinyl chloride; and (5) amides of alpha-, beta-unsaturated carboxylic acids and their N-alkylol derivatives such as acrylamide and N-methylol acrylamide. It is preferred that the total comonomer concentration should not exceed about 50%, by weight, of the resulting polymer.

Other polymers useful in the practice of this invention are based on alkyl esters of acrylic or methacrylic acids, wherein the alkyl group contains 1 to 8 carbon atoms, copolymerized with one or more copolymerizable comonomers such as amides of alpha-, beta-unsaturated carboxylic acids and their N-alkylol derivatives such as acrylamides and N-methylol acrylamide, N-isobutoxymethylol acrylamide, cyanoethylacrylamide, and acrylonitrile. It is preferred that said polymers based on alkyl esters of acrylic or methacrylic acid will contain more than about 60% of the particular acrylate ester.

In actually preparing these polymers, the practitioner may employ any of the aqueous emulsion polymerization techniques well known to those skilled in the art. These techniques generally involve the reaction of an aqueous emulsion of the respective monomers in the presence of a free radical type catalyst and, at times, other ingredients. Although various colloids such as hydroxyethyl cellulose, polymethylvinyl ether/maleic anhydride, polyacrylamide and the like may be used, it is preferred that polyvinyl alcohol is employed as the sole emulsifying agent in those preparations wherein vinyl acetate is involved. In those preparations in which vinyl acetate is not employed, surfactants such as sodium lauryl sulfate, alkyl aryl sulfonates and the like may be used as the emulsifying agent. Non-volatile buffers or salts are preferably omitted so as to eliminate the presence of any fixed basic salts which would ordinarily retard the crosslinking of the resulting polymers.

The term "ungelatinized starch" is intended to include any type starch, native or converted, which has not been placed in an aqueous medium and heated or chemically modified to a point at which the micellar network within the granules become so weakened as to allow further hydration and irreversible granular swelling. Suitable starches include, for example, those derived from corn, potato, amioca, rice sago, tapioca, waxy maize, sorghum, wheat, and the various derivatives of said starches. Hence, among the suitable starches are included the various starch derivatives such as ethers, esters, thin boiling types prepared by known processes such as mild acid treatments, oxidative, etc. and those derivatives of said starches which have high amylose contents, i.e., 50% or more by weight, of amylose. Furthermore, it is possible in the practice of this invention to employ a granular starch of which a small portion has been partially swelled by any known means or homogenized by subjecting it to shear. Therefore, our term "ungelatinized starch" is seen to include any amylaceous material which has not lost its granular polarization crosses and is capable of swelling.

As previously mentioned, it is critical in the practice of this invention that the ungelatinized starch component be employed in a range from about 0.5 to about 6.0, preferably from 1.0 to 4.0, times that amount of the resinous portion of the copolymer (based on the weight of the total dry solid content).

As previously indicated, it is of great importance that the adhesive compositions of this invention also contain an amount of urea-formaldehyde or melamine-formaldehyde thermosetting resin. Said thermosetting resin is utilized in an amount ranging from about 0.1 to about 5.0 percent, by weight, of the total composition. Among the various types of compounds useful in this capacity are included dimethylol ethylene urea, dimethylol methoxy ethyl carbamate, dimethylol hydroxyethyl triazone, dimethylol isobutyl carbamate, methylated methylol melamine, melamine-formaldehyde, and urea-formaldehyde. These compounds and others which fall in either of the aforementioned classes of thermosetting resins are usually commercially available. In the practice of this invention, it is preferred that the adhesive compositions contain from about 0.2 to about 5 percent, by weight, of the total adhesive composition of dimethylol hydroxyethyl traizone or a high molecular weight urea-formaldehyde resin.

In addition to the foregoing components, it is also required that acidic metal salt curing agents be utilized in the above described blends. The primary function of these curing agents is to cure (crosslink) the polymer or films derived from the adhesive compositions of this invention as well as enhance certain properties thereof such as their water resistance. The acidic nature of these agents also serves to accelerate the curing process.

The preferred curing agents for use in the adhesive compositions of this invention comprise acidic metal salts selected from the group consisting of chromium nitrate, chromium perchlorate, zirconium nitrate, zirconium nitrate, zirconium oxychloride, aluminum chloride, and aluminum nitrate. These curing agents may be added separately to the mixture of the starch slurry and the admixture of the polymer and the thermosetting resin, or may first be added to the starch slurry prior to its incorporation with said mixture. They may be added in either manner at the time the adhesive formulations are to be utilized, or if added earlier, they should not be introduced any more than about 48 hours prior to such utilization. The use of these acidic metal salts results in improved water resistance to a far greater degree than is possible with the use of the corresponding free acids.

It is preferred that said curing agents be utilized in an amount of from 0.1 to 2.0%, by weight, of the total adhesive composition.

The adhesive compositions of this invention should be formulated and thoroughyl blended as described above and thereafter applied, as a homogeneous dispersion, to the fiberboard by means of a corrugating machine.

Those skilled in the art will appreciate that when utilizing the multi-step, single operation corrugating machines of today, considerably higher temperatures of from about 320° to 450° F. are called for at the points at which the adhesive is applied to the flutes. Therefor, since our novel adhesives are thermosetting compositions which are cured, i.e., are crosslinked, upon exposure to temperatures between from about 40° to 252° F., they may be utilized on the various corrugators now widely employed throughout the industry, particularly those which call for the use of thermosetting-resinous adhesives. Despite the quite extensive degree of curing and concomitant improvements in water resistance and stability resulting from the mere application of the adhesive by the corrugator, the practitioner may prefer that the substantially cured adhesive be even further heated to completely cure said adhesive and thereby obtain most unusually outstanding water-resistance and stability. Such results would be realized in the case of a post-corrugation, rigid-when wet treatment wherein the further curing of the adhesive is an incidental effect of the heat required to thermoset a rigid-when-wet application.

If desired, conventional non-chemically functional additives may be incorporated into the novel adhesive compositions of this invention. Among these additives may be included: fillers such as finely ground polymers; thickeners such as inorganic colloidal clays, polyvinyl alcohol, organic compounds such as acrylic acid, polymers of ethylene oxide and the like; pigments such as titanium dioxide, barium sulphate, and the like; and dyes, preferably transparent, such as Brilliant Violet B, Fast Red 8 BLX, etc.

As previously indicated, the novel adhesive compositions of this invention are preferably prepared just prior to being applied to the fiberboard, usually to the flutes, by means of a conventional corrugating machine. Said compositions have a solid content of from about 25 to about 50 percent, preferably 40 to 43, by weight, of the total composition. Notwithstanding the rheological properties of the specific adhesive composition and the capability of the particular corrugator, the novel compositions disclosed herein may be applied in an amount to yield a dried weight of from about 0.5 to about 8.0 pounds per 1000 sq. ft. per two glue lines at a rate ranging from about 50 to about 700 fpm. At the time of application, said adhesive compositions are not sticky but become so shortly thereafter when they are substantially cured by the heat emitted from the machine, i.e., the steam applied to the double-backer hot plates or the corrugating rolls of the single facer.

The adhesive compositions herein are widely useful in various well known corrugating processes. Since they are capable of producing excellent bonds at high temperatures, unlike the so called "cold set" starch-free adhesives, they may be utilized on both single facer and double facer stations. Furthermore, these compositions are useful in the preparation of corrugated boxboards from which containers designed to be utilized under special conditions are made. Examples of such boxboard are those of the rigid-when-wet type which are usually prepared by the combined or sequential chemical and thermal processing of the corrugated board. It is the unexpected ability of our compositions to withstand considerably high temperatures for prolonged periods, e.g. between 200° and 400° F. over considerable periods which accounts for their wide usefulness. These and other advantages will become apparent from the following examples, with further illustrate, but do not limit, the scope of this invention. In these examples, all amounts are in terms of parts by weight, unless otherwise specified.

EXAMPLE I

This example illustrates the preparation of an adhesive composition typical of this invention using two optional ingredients. This example also illustrates the excellent properties of said adhesive composition when utilized in the manufacturing of corrugated boards.

The formulation of the adhesive was as follows:

| Ingredient | Amount |
| --- | --- |
| Water | 4,500 ml |
| A commercially available colloidal clay | 200 g |
| Waxy maize | 4,000 g |
| Chromium nitrate (44% aqueous solution) | 200 ml |
| Vinyl acetate/N-methylol acrylamide, (96:4 wt. ratio) (aqueous emulsion about 40% solids) | 4,000 g |
| Boric acid | 20 g |
| A commercial, high MW urea-formaldehyde resin | 400 g |

The above described ingredients were throughly stirred into a homogeneous adhesive composition which had a viscosity of 400 cps, determined by means of a Brookfield Viscometer equipped with an RVF No. 2 spindle at 20 rpm. Said composition was then utilized in the manufacturing of standard type corrugated boards, in the manner set forth below.

CORRUGATION

Several sample of single face, A-fluted corrugated boards were prepared by means of a conventional type corrugator similar to those employed in the industry. The A-fluted corrugated mediums consisted of a commercially available wet strength fiberboard which had a basis weight of 30 pounds per 1000 sq. ft., and the liner boards consisted of a commercially available wet strength fiberboard having a basis weight of 62 pounds per 1000 sq. ft. The several samples of corrugated boards were each made at one of five varied machine speeds ranging from 50 to 420 feet per minutes (hereinafter fpm). Both the medium and the liner were preheated by the various rolls over which they were passed prior to the application of the adhesive between the lower corrugator roll and the pressure roll. The average temperature of the latter rolls and said various rolls was about 350° F. In addition to being preheated in the aforementioned manner, the medium was impinged with steam to facilitate fluting. The metering gap on the glue roll, through which the adhesive was dispensed, was set at 0.012 inches. This setting allowed for a coating weight on the 7 inch wide board samples equivalent to about 1.5 pounds per 1000 sq. ft. Upon completion of the corrugating operations, the resultant corrugated boards were stored for about 24 hours under ambient conditions, and then tested as described below.

PIN ADHESION TESTING

Duplicate 2 × 4 inch samples of each of the boards obtained at each of five varied machine speeds were cut and thereafter subjected to one of three especially designed adhesion tests. In each of said tests, the actual method utilized to determine the results was based on that of the TAPPI Standard UM 802 (formerly R 337) Pin Adhesion Test, using a conventional testing apparatus obtainable from Testing Machines Inc., Mineola, Long Island, New York. The test results were recorded in terms of pounds per specimen area required to completely separate the fluted medium from the liner.

The descriptions of the three particular tests, the five varied speeds at which the corrugator was run, and the average of the two corresponding test results respectively obtained in the aforementioned manner are set forth in the table below. In this set of results and in all those reported hereinafter, the highest values represent the best results.

Table No. 1

| | Description of Tests and Results | | |
|---|---|---|---|
| Machine Speed (fpm) | Dry Pin: tested as is | Wet Pin: tested after 1 hour immersion in water | "Oven Cured" Wet Pin: tested after being dipped in water, placed in oven set at 250° F., for 20 min., held under ambient conditions, for 24 hours, and immersed in water for 1 hour |
| 50 | 105 | 27 | 32 |
| 150 | 140 | 43 | 57 |
| 250 | 127 | 41 | 55 |
| 350 | 90 | 26 | 56 |
| 420 | 120 | 27 | 50 |

As indicated by the results obtained in each of the above described tests, the resulting bonds produced by the adhesive composition were unusually water resistant and highly, thermally stable. These excellent properties displayed throughout the series of tests were especially noted in those cases wherein the adhesive bonds of the test samples were completely cured by placing them in the oven.

When an additional set of duplicate samples were tested in a manner similar to that of the procedure described above, but with a 5 hour holding time in the oven, the results were comparable to those respectively obtained wherein the oven holding time was only 20 minutes.

EXAMPLE II

This example further illustrates the preparation of our novel adhesive composition using three optional ingredients. This example also illustrates the improved properties of said composition over those of a composition similar to an adhesive which is widely utilized in the corrugated box and board industry.

The adhesive was prepared by means of a two-step preparation as follows:

Step I — A thermosetting resinous mixture was first prepared by admixing about 60.0 parts of a vinyl acetate:N-methylolacrylamide copolymer (as described in Example I) and about 7 parts of a commercially available, high molecular weight urea-formaldehyde resin with about 30 parts of water which contained about 3.0 parts of dissolved polyvinyl alcohol, and about 1.32 parts of a commercially available defoaming agent. The foregoing ingredients were moderately stirred for about 10 minutes, whereupon a homogeneous mixture was formed.

Step II — A suspension comprising 66.0 parts of water, 60.0 parts of raw corn starch, and 3.0 parts of zirconium oxychloride (33% aqueous solution) was admixed with the homogeneous mixture prepared in Step I.

In this case, the starch to polymer resin solids ratio was about 2.5:1. The viscosity of the resulting adhesive composition, as determined by the means described in Example I, was 620 cps. Said composition was stored under ambient conditions for 24 hours, and then utilized in the manufacturing of corrugated boards which were to be subsequently compared with boards made using an adhesive composition similar to that widely utilized in the corrugated box and board industry.

The adhesive composition utilized herein as a control essentially consisted of a conventional starch based carrier and a resinous secondary combination. Said carrier comprised an aqueous dispersion of gelatinized starch in which the gelatinization had been induced by caustic soda. The resinous secondary combination comprised a mixture of an aqueous suspension of granular corn starch, an aqueous emulsion of about 3.5:1 of a vinyl acetate and dibutyl maleate copolymer and vinyl acetate homopolymer. The ratio of the total starch content to the total resin content of the control composition was about 2.3:1. The viscosity of said control, determined in the same manner as that used for the sample, was 600 cps.

The two adhesive compositions described above were then each utilized in the manufacturing of a series of five corrugated boards in the manner described in Example I. In all cases, the medium and the liner were similar to those respectively employed in Example I. The resulting boards were held under ambient conditions for 24 hours, and the adhesive bonds thereof were then tested for their ability to remain intact in the presence of water and heat. The test methods utilized herein were the same as those outlined in Example I, except the oven temperature in the "Oven Cured" Wet Pin test was maintained at 350° F.

The averages of the two corresponding test results respectively obtained for each of the varied speeds, by the three test methods are presented below in Table No. 2.

Table No. 2

| Test | Machine Speed (fpm) | Test Adhesive | Control |
|---|---|---|---|
| Dry Pin: | 50 | 113.0 | 83.0 |
| | 150 | 168.0 | 118.0 |
| | 250 | 167.5 | no adhesion |
| | 350 | 145.0 | no adhesion |
| | 420 | 147.0 | no adhesion |
| Wet Pin: | 50 | 13.5 | 11.0 |
| | 150 | 33.0 | 15.5 |
| | 250 | 35.0 | no adhesion |
| | 350 | 18.0 | no adhesion |
| | 420 | 13.5 | no adhesion |
| "Oven Cured" Wet Pin: | 50 | 29.0 | 20.0 |
| | 150 | 51.0 | 34.0 |
| | 250 | 62.0 | no adhesion |

Table No. 2-continued

| Test | Machine Speed (fpm) | Test Adhesive | Control |
|------|---------------------|---------------|---------|
|      | 350                 | 72.0          | no adhesion |
|      | 420                 | 66.0          | no adhesion |

The data presented above clearly shows the unusually greater water resistance of the test adhesive composition over the control. The superiority of the test adhesive is consistently reflected by the better results obtained throughout the entire series of tests. As indicated by the absence of any measurable results, the control adhesive was unable to produce a stable bond at machine speeds in excess of 150 fpm.

EXAMPLES III – V

These examples illustrate the usefulness of various granular starches in the preparation of adhesive compositions typical of this invention.

Each of three test adhesives designated A, B, and C, were prepared by means of the two step procedure outlined in Example I, utilizing 0.5%, by weight, of chromium nitrate based on the weight of the total adhesive composition (total solids plus water) in place of the zirconium oxychloride. In all three cases, the starch to resin ratio was approximately 2:1. The particular starches respectively employed were raw corn starch in sample A, waxy maize in sample B, and raw wheat starch in sample C. The viscosities of the thusly prepared adhesive compositions, as determined by means of the method described in Example I were 600 cps, 900 cps, and 880 cps, respectively. Each of said compositions was then utilized in the manufacturing of a series of A-fluted, single face corrugated boards, at varied machine speeds, in a manner similar to that set forth in Example I. The resulting boards were held under ambient conditions for 24 hours, and then each of three sets of 2 × 4 inch duplicate samples taken from each board was tested by the means employed in Example II. The test results are presented below in Table No. 3.

Table No. 3

| Test | Machine Speed (fpm) | Sample Identification A | B | C |
|------|---------------------|---|---|---|
| Dry Pin | 50  | 144   | 150   | (36.5 |
|         | 150 | 179.5 | 179   | 167.5 |
|         | 250 | 169.5 | 177.5 | 168   |
|         | 350 | 164   | 162.5 | 150   |
|         | 420 | 140   | 158   | 155   |
| Wet Pin | 50  | 31    | 23.5  | 33.5  |
|         | 150 | 41.5  | 29.0  | 47.0  |
|         | 250 | 48.5  | 31.0  | 42.5  |
|         | 350 | 56.5  | 37.0  | 38.5  |
|         | 420 | 56.0  | 53.0  | 44.0  |
| "Oven" Cured Wet Pin | 50  | 42.0 | 36.5 | 43.0 |
|         | 150 | 72.0  | 56.0  | 54.5  |
|         | 250 | 88.0  | 60.0  | 54.5  |
|         | 350 | 90.0  | 63.5  | 78.5  |
|         | 420 | 68.0  | 83.5  | 78.0  |

EXAMPLE VI

This example further illustrates the preparation of an adhesive composition typical of this invention and, the thermal stability and water resistance of said composition.

To make the adhesive composition, in this case, Example II was repeated, using about 1.75 parts of aluminum chloride in lieu of the zirconium oxychloride. The resultant composition had a viscosity of 620 cps, as determined in the above described manner.

Portions of the immediately described composition were utilized in the preparation of a series of five, single face corrugated boards, at varied machine speeds. The resultant boards were held for 24 hours under ambient conditions, and then the bonds of duplicate samples taken from each of said boards were tested by the three methods described hereinabove. The varied speeds at which the corrugations were carried out and the average of the respective tests results were as follows:

| Machine Speed (fpm) | Dry Pin | Wet Pin | "Oven Cured" Wet Pin |
|---------------------|---------|---------|----------------------|
| 50  | 142.5 | 28.0 | 38.0 |
| 150 | 168.5 | 43.0 | 53.0 |
| 250 | 164.5 | 35.0 | 72.0 |
| 350 | 172.5 | 57.0 | 75.5 |
| 420 | 163.5 | 56.0 | 72.5 |

The data presented above clearly shows the unusually outstanding thermal stability and water resistance of the present composition wherein an aluminum chloride and urea-formaldehyde combination is employed.

EXAMPLES VII – X

These examples illustrate the use of different amounts of starch in additional adhesive compositions typical of this invention and, the water resistance and thermal stability of said compositions.

Each of six test adhesive compositions, D – I, were prepared using the ingredients and method set forth in Example II, using a varied amount of corn starch with chromium nitrate, in lieu of the zirconium oxychloride.

In each of the preparations, the amount of chromium nitrate utilized was about 0.5%, by weight, of the total composition.

Portions of each of the compositions described above were utilized in the manufacturing of five single face-corrugated boards, at varied machine speeds by the method outlined in Example I. The resulting boards were then stored under ambient conditions for 24 hours. Thereafter three sets of duplicate 2 × 4 inch samples cut from said boards were each subjected to the Pin Adhesion tests described in Example II.

The ratio of starch to resinous solids of the copolymer, corresponding viscosities, and the averaged test results are set forth below in Table No. 4.

Table No. 4

| Sample | Starch: Copolymer Solids | Viscosity (cps) | Machine Speed (fpm) | TEST Results Dry Pin | Wet Pin | "Oven Cured" Wet Pin |
|---|---|---|---|---|---|---|
| D | 0.5:1.0 | 480 | 50 | 99.0 | 32.0 | 30.5 |
|   |   |   | 150 | 178.5 | 48.5 | 67.5 |
|   |   |   | 250 | 194.5 | 61.0 | 81.0 |
|   |   |   | 350 | 181.5 | 75.0 | 92.5 |
|   |   |   | 420 | 183.0 | 72.0 | 92.5 |
| E | 1.0:1.0 | 850 | 50 | 163.5 | 38.5 | 37.5 |
|   |   |   | 150 | 189.0 | 55.0 | 69.5 |
|   |   |   | 250 | 184.0 | 66.5 | 86.5 |
|   |   |   | 350 | 201.5 | 69.5 | 87.5 |
|   |   |   | 420 | 196.0 | 70.5 | 86.0 |
| F | 3.0:1.0 | 240 | 50 | 107.0 | 16.0 | 23.5 |
|   |   |   | 150 | 156.0 | 33.0 | 46.0 |
|   |   |   | 250 | 180.5 | 40.0 | 60.5 |
|   |   |   | 350 | 169.5 | 36.5 | 77.0 |
|   |   |   | 420 | 172.0 | 41.0 | 76.0 |
| G | 4.0:1.0 | 260 | 50 | 93.0 | 13.5 | 15.5 |
|   |   |   | 150 | 156.0 | 26.0 | 38.5 |
|   |   |   | 250 | 166.0 | 31.0 | 52.0 |
|   |   |   | 350 | 155.5 | 25.0 | 62.0 |
|   |   |   | 420 | 169.5 | 30.5 | 70.5 |
| H | 5.0:1.0 | 280 | 50 | 122.5 | 13.5 | 20.5 |
|   |   |   | 150 | 156.0 | 16.5 | 35.0 |
|   |   |   | 250 | 151.5 | 17.5 | 40.0 |
|   |   |   | 350 | 132.0 | 12.0 | 34.0 |
|   |   |   | 420 | 121.0 | 8.5 | 28.5 |
| I | 6.0:1.0 | 320 | 50 | 134.0 | 11.0 | 20.5 |
|   |   |   | 150 | 150.5 | 12.0 | 25.0 |
|   |   |   | 250 | 150.0 | 8.5 | 36.5 |
|   |   |   | 350 | 140.0 | 5.5 | 3.5 |
|   |   |   | 420 | 98.5 | 2.5 | — |

Based on the results presented above, it becomes apparent that the amount of ungelatinized starch utilized in preparing the adhesive compositions of this invention may be varied over a wide range. The outstanding water resistance and thermal stability characteristics of such compositions are shown by the excellent results consistently obtained throughout the series of tests.

EXAMPLES XI — XII

These examples illustrate the usefulness of additional acid salt curing agents in the preparation of our novel adhesive compositions.

Two test sample compositions, J and K, were made by blending two mixtures which, except for a varied salt catalyst, had the same formulation.

The respective formulations of said compositions were as follows:

The two above described compositions were then utilized in the manufacturing of a series of single faced, A-fluted corrugated boards, at machine speeds ranging from 100 to 400 fpm, in a manner similar to that outlined in Example I. The resulting corrugated boards were held for 24 hours under ambient conditions and, thereafter, duplicate samples taken from each board were subjected to the "Straight" Wet Pin Test described in Example I.

The viscosity, the varied machine speeds utilized, and the respective test results are presented below in Table No. 5.

Table No. 5

| Sample | Viscosity (cps) | Machine Speed (fpm) | Wet Pin |
|---|---|---|---|
| J | 450 | 100 | 38 |
|   |   | 200 | 37 |
|   |   | 300 | 40 |
|   |   | 400 | 36 |
| K | 400 | 100 | 57 |
|   |   | 200 | 65 |
|   |   | 300 | 65 |
|   |   | 400 | 65 |

The data presented above clearly shows that various other acid salt catslysts may be utilized in the same

| Ingredient | Sample and Amount (grams) J | K |
|---|---|---|
| Part A: |   |   |
| Water | 450 | 450 |
| Corn Starch | 400 | 400 |
| ViAc:NMA copolymer (as in Ex.I) | 400 | 400 |
| Boric Acid | 2 | 2 |
| Part B: |   |   |
| A commercial colloidal clay | 20 | 20 |
| Corn Starch | 40 | 40 |
| Urea-formaldehyde resin (high molecular weight) | 40 | 40 |
| Aluminum Sulfate | 12 | — |
| Aluminum Chloride | — | 12 | manner as the zirconium oxychloride and the chromium nitrate, in the preparation of the present novel adhesive compositions.

EXAMPLE XIII

This example illustrates the usefulness of our novel adhesive compositions in the preparation of corrugated boards using a medium and a liner which have been previously treated with a rigid-when-wet coating composition.

In this case, two A-flute, single face boards were prepared, at varied machine speeds, in a manner similar to that employed in Example I, except herein the corrugating medium and the liner had been impregnated with a resole phenolic resin system of the type disclosed in U.S. Pat. No. 3,697,365. The formulation of the adhesive composition utilized to bond said medium to said liner was the same as used in Exmple I. The resulting corrugated boards were set aside under ambient conditions for 24 hours and were then tested as described below.

Six 2 × 4 inch samples were taken from each board. One of said samples was subjected to the Pin Adhesion Test described hereinabove. The remaining five samples were each handled in a special manner prior to being similarly tested. The particular manner in which each of said five samples were further conditioned and the respective test results for all six samples are set forth in the table below.

In this case, corn starch was used in combination with a urea-formaldehyde thermosetting resin, and aluminum chloride was employed as the acid salt catalyst.

The formulation of the test sample herein was as follows:

| Ingredients | Amount (grams) |
|---|---|
| Water | 450 |
| Corn starch | 430 |
| Boric acid | 2 |
| Polyvinyl acetate (aqueous emulsion about 40% solids) | 400 |
| A commercially available colloidal clay | 30 |
| A commercially available high MW urea-formaldehyde resin | 40 |
| Aluminum chloride | 12 |

The above described ingredients were thoroughly stirred into a homogeneous composition which had a viscosity of 250 cps as determined by the method described in Example I. Said composition was then utilized in the manufacturing of a series of standard type, A-fluted corrugated boards, at machine speeds ranging from 100 to 400 fpm, in a manner similar to that outlined in Example I. The resulting corrugated boards were stored under ambient conditions for 24 hours and thereafter tested by means of the standard Pin Adhesion test described in Example I. The varied speeds at which the corrugator was run and the corresponding test results are set forth below.

Table No. 6

| | | Test Results | | | | | |
|---|---|---|---|---|---|---|---|
| Machine Speed (fpm) | Dry (As is) | 1 hour immersion in water* | 1 hour 30 min. at 400° F. | 1 hour immersion after 30 min. at 400° F. | 5 mins. at 250° F. | 1 hour immersion after 5 mins. at 250° F. | |
| 100 | 99 | 30 | 79 | 42 | 119 | 39 | |
| 250 | 119 | 23 | 74 | 47 | —** | — | |

*All immersions were made in water maintained at 77° F.
**Not tested.

The data presented above clearly illustrate that the novel adhesive compositions of this invention are useful in the manufacturing of corrugated boards of which the medium and liner have been treated with a conventional type thermosetting, rigid-when-wet mixture. The outstanding water resistance and thermal stability of the adhesive composition are reflected by the good to excellent results reported.

EXAMPLE XIV

This example illustrates the high degree of water resistance and excellent thermal stability of a polyvinyl acetate based adhesive composition typical of this invention.

Table No. 7

| | Description of Tests and Results | | | | |
|---|---|---|---|---|---|
| | | "Oven Cured" Wet Pin: | | | |
| | Wet Pin: | tested after being immersed in water for | | | |
| Machine | tested after 1 | 1 hour following cure in oven set at | | | |
| Speed | hour immersion | 400° F. for period indicated below. | | | |
| (fpm) | in water (77° F.) | 3 min. | 5 min. | 10 min. | 15 min. |
| 100 | 45 | 56 | 61 | 59 | 68 |
| 200 | 43 | 50 | 54 | 58 | 63 |
| 300 | 37 | 42 | 49 | 48 | 54 |
| 400 | 36 | 38 | 45 | 55 | 50 |

The data presented above clearly indicate that polyvinyl acetate based adhesive compositions prepared in accordance with this invention yield bonds which are water-resistant and thermally stable.

When a series of single face, A-fluted corrugated boards prepared with a polyvinyl acetate based adhesive composition similar to that described above, but having polyvinyl alcohol as a thickener instead of the colloidal clay, were tested, the results were comparable to those set forth above.

EXAMPLE XV

This example illustrates the usefulness of an interpolymer in the preparation of an adhesive composition, in accordance with this invention.

In this case, a butyl acrylate based terpolymer was utilized in the preparation of an adhesive composition in the following manner:

A thickener mixture was first prepared by slowly dissolving 179.22 grms of polyvinyl alcohol in a solution comprised of 76.56 grams of a commercially available colloidal clay and 1.16 grams of a defoaming agent in 1711.0 grams of water. Then 405.0 grams of the resulting mixture was admixed with a slurry having the following formulation:

| Ingredient | Amount (grams) |
|---|---|
| Water | 1122.0 |
| Corn starch | 1020.0 |
| A polyvinyl alcohol stabilized terpolymer of butyl acrylate, vinyl acetate, and N-isobutoxymethylol acrylamide (75.0:25.0:1.5 wt. ratio) | 1003.0 |
| Dimethyl hydroxyethyl triazone (Protorez 1850) | 120.2 |
| Chromic nitrate | 51.0 |

Said terpolymer was synthesized by a conventional means of emulsion polymerization. Said adhesive composition was then utilized in preparation of a series of four single face corrugated boards, at varied speeds up to 350 fpm, as described in Example I. Upon being allowed to equilibrate at ambient conditions over a period of 24 hours, the bonds of said boards were tested by methods employed in Example II, except that the combined extended curing step and thermal stability evaluation of the "Oven Cured" Wet Pin test involved placing the samples in an oven set at 350° F., for 20 minutes. The varied machine speeds and the corresponding averages of the results obtained from duplicate samples are set forth below.

Table No. 8

| Machine Speed (fpm) | Test Results | | |
|---|---|---|---|
|  | Dry Pin | Wet Pin | "Oven Cured" Wet Pin |
| 50 | 52.5 | 9.0 | 13.5 |
| 150 | 119.0 | 7.5 | 22.0 |
| 250 | 134.0 | 16.5 | 31.5 |
| 350 | 112.0 | 22.5 | 27.0 |

The data summarized above clearly indicates that butyl acrylate based interpolymers are readily useful in the preparation of the adhesive compositions of this invention.

EXAMPLE XVI

The procedure outlined in Example XV was repeated to make an adhesive composition using the same amount of a terpolymer essentially consisting of butyl acrylate, acrylonitrile, and N-methylol acrylamide (95:5:3 wt. ratio). Portions of this adhesive composition were utilized in the manufacturing of a series of three single face corrugated boards at varied machine speeds up to 250 fpm. The adhesive bonds of said boards exhibited water resistance and thermal stability properties comparable to those of the test sample in Example XV.

Summarizing, our invention provides corrugating adhesive compositions which yield bonds capable of exhibiting outstanding water resistance and thermal stability. Furthermore, our invention provides adhesive compositions which are useful in the preparation of rigid-when-wet, as well as conventional corrugated boxboard. As used herein, "outstanding" water resistance and thermal stability means that the laminate bonded with the cured adhesive will not exhibit a tendency to separate when immersed in water either before or after being exposed to temperatures between about 250° and 450° F. for a considerable period, yielding a wet or dry bond strength substantially in excess of commercial standards.

Variations in procedures and proportions may be made without departing from the scope of this invention which is defined by the following claims.

We claim:

1. A corrugating adhesive composition capable of yielding dry films which are characterized by their outstanding water resistance and thermal stability; said adhesive composition comprising a mixture of (a) a crosslinkable polymer in aqueous emulsion form selected from the group consisting of vinyl acetate homopolymers, copolymers of vinyl acetate with one or more ethylenically unsaturated copolymerizable comonomers, and copolymers of $C_1$–$C_8$ alkyl esters of acrylic and methacrylic acids with one or more ethylenically unsaturated copolymerizable comonomers; (b) an ungelatinized starch which is present in amount ranging from 0.5 to 6.0 times the amount of the resinous content of said polymer, (c) a thermosetting resin selected from the group consisting of dimethylol ethylene urea, dimethylol methoxy ethyl carbamate, dimethylol isobutyl carbamate, dimethylol hydroxyethyl triazone, methylated methylol melamine, melamineformaldehyde, and urea-formaldehyde; said thermosetting resin being present in an amount ranging from about 0.1 to about 5.0% by weight, of the total composition, (d) an acidic metal salt curing agent selected from the group consisting of chromium nitrate, chromium perchlorate, zirconium nitrate, aluminum chloride, zirconium oxychloride, aluminum sulfate and aluminum nitrate; said acidic metal salt curing agent being present in an amount ranging from about 0.1 to about 2.0%, by weight, of the total composition, and (e) water; said composition having a viscosity of from about 100 to 2500 cps.

2. The adhesive composition of claim 1 wherein said crosslinkable polymer is polyvinyl acetate or copolymer of vinyl acetate with one or more copolymerizable comonomers selected from the group consisting of (1) alpha-beta unsaturated mono and dicarboxylic acids containing from 3 - 6 carton atoms, (2) alkyl esters of acrylic and methacrylic acids wherein the alkyl group contains from 1 to 8 carbon atoms, (3) mono- or dialkyl esters of alpha, beta unsaturated dicarboxylic acids wherein said acids contain from 3 to 6 carbon atoms, and the alkyl groups contain from 1 to 8 carbon atoms, (4) vinyl halides, and (5) amides of acrylic and methacrylic acids and their N-alkylol derivatives; said vinyl acetate being present in an amount of at least 50%, by weight, of the copolymer.

3. The adhesive composition of claim 1 wherein said crosslinkable polymer is a copolymer of an alkyl ($C_1$–$C_8$) ester of acrylic or methacrylic acid with one or more copolymerizable comonomers selected from the group consisting of amides of acrylic or methacrylic acid; N-alkylol amides of acrylic or methacrylic acid, cyanoethylacrylamide; and acrylonitrile; said alkyl ester of acrylic or methacrylic acid being present in an amount of at least 60%, by weight, of the copolymer.

4. An adhesive composition comprising a copolymer of vinyl acetate and N-methylol acrylamide having at least 50%, by weight, of vinyl acetate; from 1.0 to 4.0 times the weight of the resinous content of said copolymer of ungelatinized corn starch; from about 0.1 to about 5.0%, by weight, of the total composition of a thermosetting resin selected from the group consisting of dimethylol ethylene urea, dimethylol hydroxyethyl triazone, dimethylol methoxy ethyl carbamate, dimethylol isobutyl carbamate, methylated methylol melamine, melamine-formaldehyde, and ureaformaldehyde; from about 0.1 to about 2.0%, by weight, of the total composition of an acidic metal salt curing agent selected from the group consisting of chromium nitrate, chromium perchlorate, zirconium nitrate, aluminum nitrate, zirconium oxychloride, aluminum sulfate and aluminum chloride; and water; said copolymer being in aqueous emulsion form and said composition having a viscosity of from about 200 to 1400 cps.

5. The adhesive composition of claim 4 wherein said copolymer is replaced with polyvinyl acetate.

6. The adhesive composition of claim 4 wherein said corn starch is replaced with an ungelatinized waxy maize.

7. The adhesive composition of claim 4 wherein said copolymer is replaced with a copolymer of butyl acrylate, vinyl acetate and N-isobutoxy methylol acrylamide; said butyl acrylate being present in an amount of at least 60%, by weight, of the total copolymer.

8. The adhesive composition of claim 4 wherein said copolymer is replaced with a copolymer of butyl acrylate, acrylonitrile, and N-methylol acrylamide; said butyl acrylate being present in an amount of at least 60%, by weight, of the total copolymer.

9. A corrugated paperboard product prepared employing the adhesive composition of claim 1.

10. A corrugated paperboard product prepared employing the adhesive composition of claim 5.

11. A corrugated paperboard product prepared employing the adhesive composition of claim 7.

12. A corrugated paperboard product prepared employing the adhesive composition of claim 8.

* * * * *